Dec. 5, 1939.    H. J. CRINER    2,182,281
BREAD SLICING MACHINE
Filed Jan. 11, 1937    2 Sheets-Sheet 1
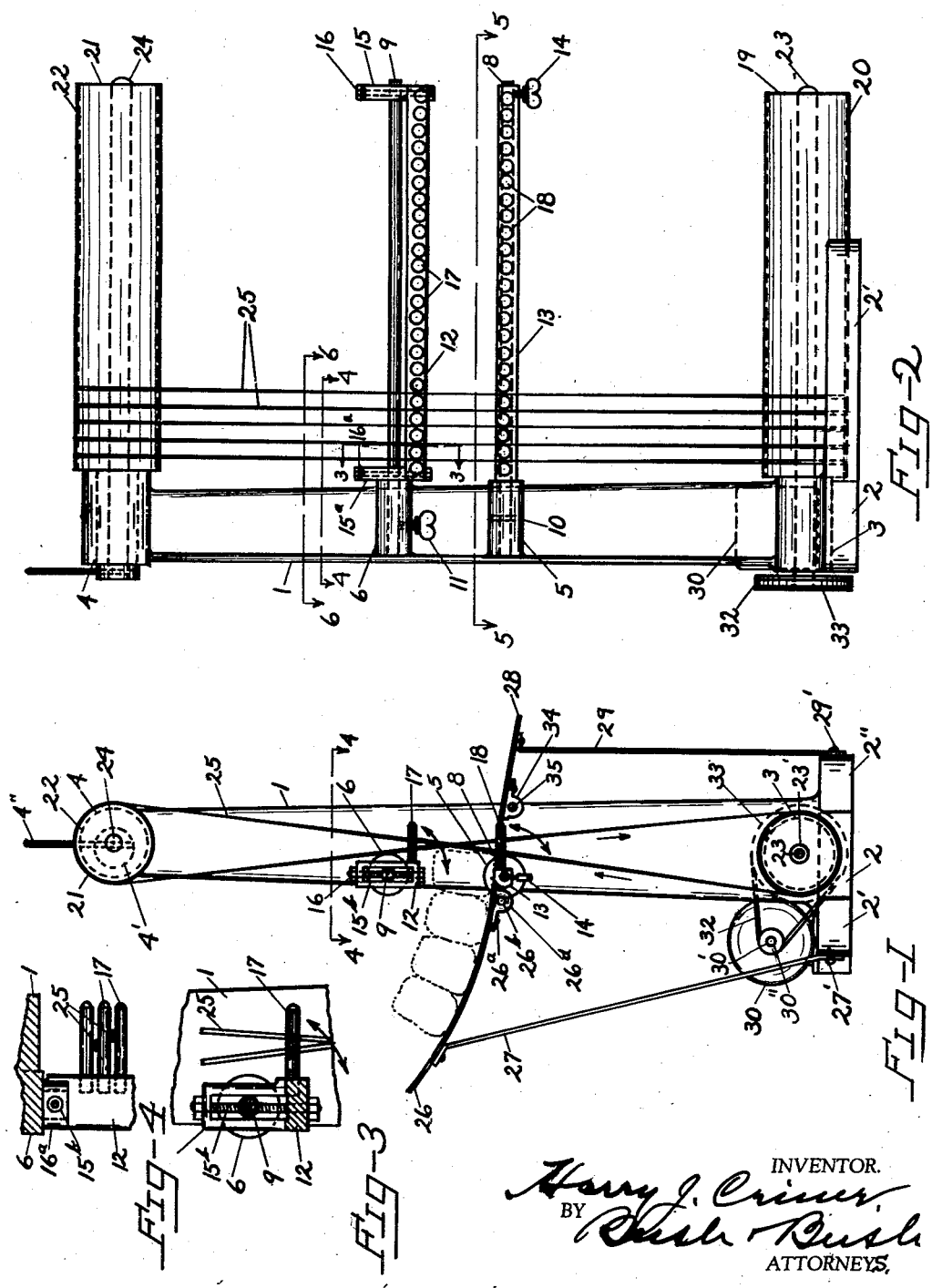
INVENTOR.
Harry J. Criner
BY
ATTORNEYS.

Dec. 5, 1939.   H. J. CRINER   2,182,281
BREAD SLICING MACHINE
Filed Jan. 11, 1937   2 Sheets-Sheet 1
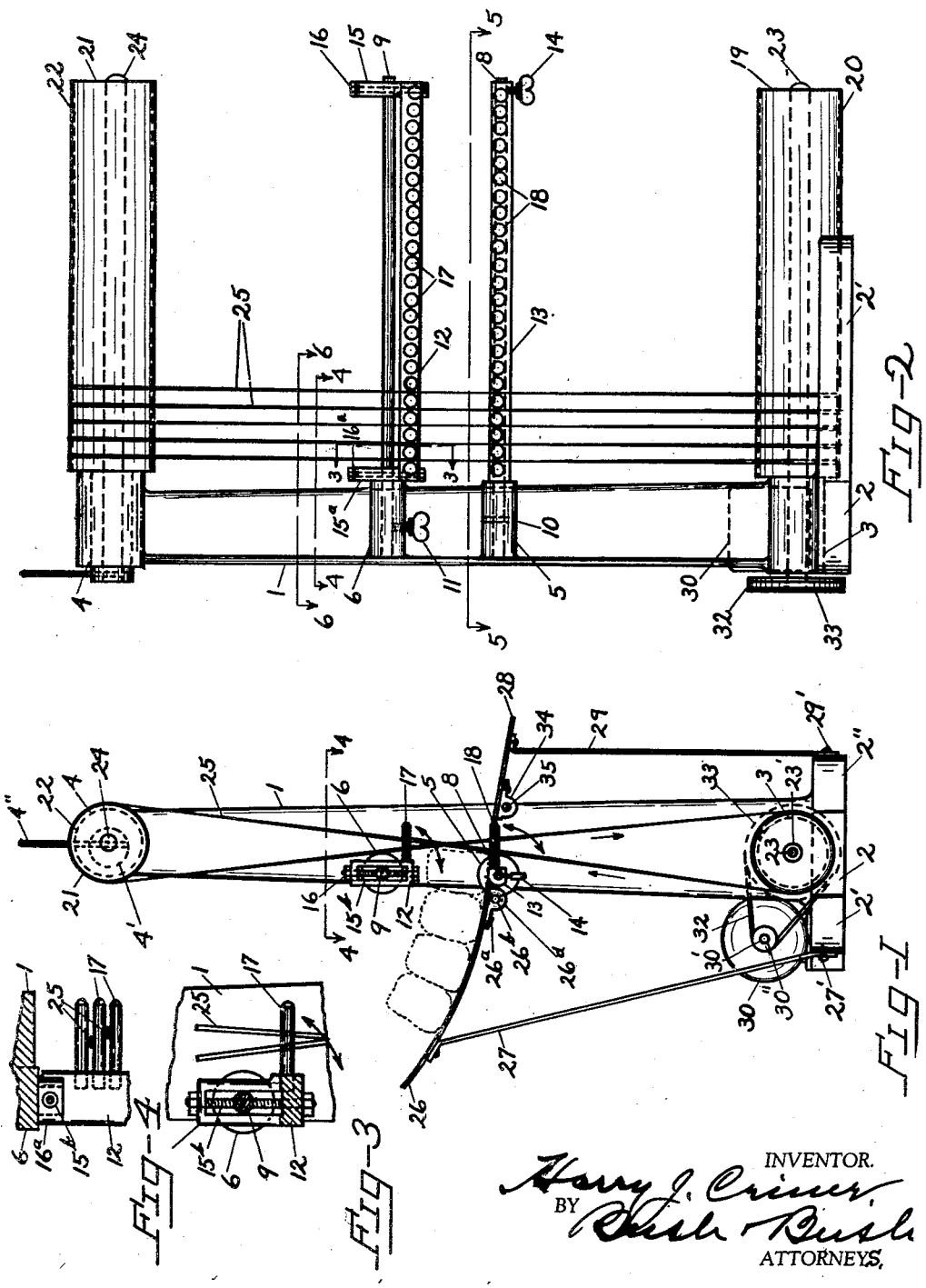
INVENTOR.
Harry J. Criner,
BY
ATTORNEYS.

Patented Dec. 5, 1939

2,182,281

UNITED STATES PATENT OFFICE 2,182,281

BREAD SLICING MACHINE

Harry J. Criner, Davenport, Iowa, assignor of one-half to A. G. Bush, Davenport, Iowa Application January 11, 1937, Serial No. 119,936

6 Claims. (Cl. 146—88)

My invention relates to improvements in bread slicing machines of the band-blade type and the objects of my invention are to provide a simplified form of slicing machine having continuous band-blades which can be operated with either crossed or uncrossed blades; to provide simple, movable, and interchangeable means for guiding and spacing the blades and for changing the gauge thereof which is also capable of supporting the bread while being sliced and is applicable to either crossed or uncrossed band-blade machines; also to provide improved means for tightening and loosening the blades, to facilitate removal or replacement of a blade or blades.

I attain these objects by the means illustrated in the accompanying drawings, in which—

Figure 1 shows a side elevation of my machine from the right of the machine as shown in Figure 2.

Figure 2 shows an elevation of the discharge side of the machine, but for simplicity, omits a part of the blades and part of the guide fingers.

Figure 3 is an enlarged sectional detail of a part of the upper guide bar on the line 3—3 of Figure 2.

Figure 4 is an enlarged sectional detail of a part of the lower guide bar on the line 4—4 of Figure 2.

Figure 5 is a sectional detail on the line 5—5 of Figure 2.

Figure 6 is a fractional sectional detail of an alternate form of guide approximately on the line 6—6 of Figure 2.

Figure 7 is a detail side elevation of a part of Figure 6.

Figure 8 is an enlarged detail showing a fractional part of one of the band-blades.

Figure 9 is a diagrammatic view of an alternate form of crossed band-blades with means for causing the crossed portions to travel in paths closely approximating a vertical plane.

Figures 10 and 11 are diagrammatic views of alternate forms of structure which will avoid the necessity for crossing the blades in figure 8 form and which will permit ascending and descending portions to travel in parallel lines approximately in the same vertical plane.

Figure 12 is an enlarged detail of the cutting portion of the uncrossed blades showing the relative positions of the upward and downward moving portions thereof in their angular positions, with the guide bars 12 and 13 in section, as it would crowd the lines together and make them indefinite if attempted to be shown on the scale of Figure 11.

Similar numerals refer to similar parts throughout the several views.

My machine comprises a vertical side frame 1, which may be of cast-iron or other suitable material and is preferably formed T-shaped in section. Integral with the side frame 1, I form a base 2, having bifurcated feet 2' and 2", extending to the right therefrom, as shown in Figure 2. This base, and the feet integral therewith, are preferably formed of cast-iron or other heavy material and are made wide enough and long enough to afford a firm support for the machine. The base may also be made thinner if desired and bolted to a table or cushioned sub-base of any desired form, in order to afford the necessary firmness and freedom from vibration.

At one side of the lower part of the side frame 1, I mount an electric motor or other prime mover 30, having a shaft 30', on which is mounted a drive pulley 30", which carries a belt 32, which passes over and drives a pulley 33, mounted upon a shaft 23, which is revolvably secured in suitable bearings 23', secured in the lower part of the side frame 1. The shaft 23 extends out to the full width of the machine and carries a drum or cylinder 19 rotatably mounted thereon and covered with a sheet of rubber or other elastic covering 20.

At the upper end of the side frame 1, I form a boss 4, in which an eccentric bearing 4' is seated, having an operating handle 4" united thereto. This eccentric bearing carries a shaft 24 revolvably mounted therein which extends laterally the entire width of the machine and carries the upper drum 21, which is likewise covered with a resilient or rubber covering 22.

The shaft 24 is so mounted in the eccentric bearing that moving the handle 4" to the right as shown in Figure 1, will carry the shaft 24 downwardly so as to lessen the distance between it and 23 and thereby loosen the blades. To operate the handle 4" to the left, will likewise tend to raise the shaft 24 and tighten the blades.

Upon the drums 19 and 21, I mount a plurality of endless band-blades which may be crossed as shown in Figures 1 and 9, or may be uncrossed as shown in Figures 10 and 11.

When the blades are uncrossed, both edges of the blades may be sharpened if desired, so as to give double the length of cutting edge and lengthen the intervals at which it is necessary to sharpen or replace the blades.

In order to gauge and guide the blades and cause them to present a cutting edge to the bread, I form bosses 5 and 6, integral with the side frame 1. In the lower boss 5, I mount a pivot bar 8, secured against turning in the boss by a pin or key 10. Upon the bar 8, I slidingly mount a guide bar 13.

Mounted upon the bar 13, or formed integral therewith, I form a plurality of guide fingers 18, the free ends of which extend toward the rear or discharge end of the machine. These fingers 18 may be rigidly secured to the bar 13 or they may be pivotally mounted thereon so as to be revolvable. The fingers 18 are preferably made of steel tempered and hardened to an extreme or glasslike hardness.

In the outer end of the bar 13, I mount a thumb screw 14, the inner end of which may bear against the shaft 8, to secure it rigidly in its adjusted position as desired. The free ends of the fingers 18 are reduced to a rather blunt point to facilitate entrance between the cutting blades.

The fingers 18 are formed having a diameter equal to the desired thickness of the slices of the bread to be produced. When constructed and mounted as stated, it is a simple matter to loosen the thumb screw 14, slide the bar 13 off the shaft 8, and replace it by a new guide bar having either narrower or wider spaced fingers which, after being slid upon the shaft 8, can be secured in position by the thumb screw 18 and will cause the blades 25 to space themselves correspondingly upon the drums 19 and 21. The guide bar 13 and the fingers 18 are mounted at approximately the same level as the end of the feed chute, but may be level or inclined as desired. It is preferable to so form and mount the lower end of the feed chute and the guide bar and fingers as to cause the upper and lower portions of an advancing loaf of bread to contact the ascending and descending portions of the cutting blades simultaneously so as to prevent any jumping of the bread which might otherwise occur.

A similar guide bar 12, with fingers 17, similarly mounted, may be secured to the frame above the cutting level which will space and guide the blades above the cutting region, but I prefer to form the upper guide bar 12 as shown in Figure 2, where yokes 15 and 15a are formed integral with the bar 12. The yokes have revolvably mounted therein threaded adjusting bolts 16 and 16a. These bolts are threaded into suitable threaded bores formed in a rod 9. One end of the rod 9 is inserted in a suitable opening in a boss 6, united to the frame 1, and may be secured therein by a thumb screw 11.

The guide bar 12 has pointed fingers formed therein or united thereto, similar to the fingers 18. When it is desired to change the gauge of the upper guide fingers, the thumb screw 11 is loosened, the shaft 9 is then withdrawn from the boss 6, and the entire assembly of guide bar 12, fingers 17, yokes 15 and 15a, and bolts 16 and 16a, may be substituted for the one removed.

The adjusting bolts 16 and 16a operate to cause the guide bar 12 to be raised or lowered as desired, to accommodate various sizes of bread loaves.

Upon the lower and upper drums 19 and 21, I mounted a plurality of thin, narrow, endless cutting bands 25, having one or both edges thereof sharpened, preferably in scallops, to cut the loaves of bread.

In Figures 1 and 9 I have shown these bands crossed in figure 8 form and in a manner well known. When so mounted the blades will tend to turn automatically so the middle portion thereof will be turned at right angles to the upper and lower portions which embrace the drums 19 and 21.

When the drums or cylinders are properly spaced apart, very little additional guiding or spacing effort will be required to cause the cutting portions of the blades to travel in lines parallel to the slices desired to be cut. Consequently there will be very little wear upon the fingers 17 and 18.

In the form shown in Figures 10 and 11, additional bosses are formed upon the side frame 1, carrying shafts 19d and 21d, upon which are revolvably mounted idler rolls 19a, 19b and 19c, and 21a, 21b and 21c, which bear against the blades and deflect them so that the descending and ascending portions thereof will travel so closely together that they are practically in a single vertical plane.

The same arrangement of guide bars and guide fingers may be provided for the uncrossed cutting bands, as for the crossed bands, but the fingers will not need to be so long.

In case of the uncrossed blades, the fingers will perform the entire function of spacing and twisting the blades so that the cutting portions thereof will stand at right angles to the portions contacting the drums and the upper and lower guide bars and fingers will perform exactly the same functions as to guiding and supporting the loaves of bread while being sliced.

In order to feed the bread to the cutting blades, I provide a feed chute 26, mounted upon a suitable arm or brace 27, the lower end of which is secured to the base 2 by a bolt 27'. The lower end of the feed chute may be supported by a bar 26b, mounted in a boss 26d, formed integral with the side frame 1 and carrying a bracket 26a, to which the feed chute may be bolted or otherwise secured.

A discharge chute 28 is similarly mounted at the rear of the machine upon the brace 29, secured to the base by the bolt 29', and the inner end of it may, by a bracket 34, be mounted upon a bar 35, suitably united to the frame 1.

In the operation of my machine, the cutting blades 25 are adjusted and spaced upon the drums as desired. The proper guide bars are then mounted upon the side frame to give the desired lateral spacing for the cutting portion of the blades. The motor is then started and the bread advances upon the feed chute to the cutting blades, contacting ascending and descending portions simultaneously. While being cut, the bread is supported by the lower fingers 18 and held against upward displacement by the upper fingers 17.

As the bread passes through the blades, it is supported by the discharge chute 28, from which it may be conducted to a wrapping machine or otherwise handled as desired.

In Figures 6 and 7 I have shown a form of floating guide which may be used as desired for the upper guide. It is positioned relative to the bread as shown in Figure 7, the left ends of the arms being mounted on a pivot bar removably secured in an extension 1a of the frame 1, and the right ends being united by a fingered crossbar.

A stop 1b is united to the extension 1a and acts to limit the downward movement of the bar 12. When so formed, the weight of the bar 12 will hold it against the top of the bread and thus provide automatically for guiding loaves of varying thickness.

When my machine is constructed to operate uncrossed blades as shown in Figure 11, the idlers 19a and 21a may guide the portions of the blades moving in one direction to a plane from one-sixteenth to one-eighth of an inch from the plane of the portions of the blades moving in the opposite direction.

With uncrossed blades, I prefer to have the descending portions of the blades contact the bread first and when spaced as just indicated, the descending cutting edges of the blades will not displace the bread materially before the bread is contacted by the upwardly moving cutting edges and the pull of the cutting edges in one direction will be offset by the corresponding pull in the opposite direction.

I do not limit my claims to the precise forms shown in the drawings as many modifications may be made without departing from the spirit of my invention.

I claim:

1. In a bread slicing machine having supporting means and a plurality of spaced slicing blades mounted to travel longitudinally thereon, an adjustable guide member comprising a shaft having one end removably united to the supporting means, a crossbar with brackets at each end thereof slidingly mounted upon the shaft and carrying a plurality of fingers adapted to extend between the slicing blades when in operable position, bores formed in the brackets respectively, corresponding bores formed in the shaft and threaded, bolts seated in the bores of the brackets and threaded into the bores in the shaft adapted to adjust the relative spacing of the crossbar and the shaft.

2. In a bread slicing machine having supporting means and a plurality of spaced slicing blades mounted to travel longitudinally thereon, an adjustable guide member comprising a transverse shaft united to the supporting means, a crossbar with brackets at each end thereof removably mounted upon the shaft and carrying a plurality of fingers adapted to extend between the slicing blades when in operable position, bores formed in the brackets respectively, corresponding threaded bores formed in the shaft, and adjusting screws seated in the bores of the brackets and passing through the threaded bores in the shaft adapted to adjust the heighth of the crossbar relative to the shaft.

3. In a bread slicing machine having supporting means and a plurality of spaced slicing blades mounted to travel longitudinally thereon, an adjustable guide member comprising a shaft having one end removably united to the supporting means with means for securing it rigidly therein, a crossbar slidingly mounted upon the shaft and carrying a plurality of fingers adapted to extend between and guide the slicing blades when in operable position, a set-screw threaded in the crossbar adapted to secure the crossbar upon the shaft in various positions.

4. In a bread slicing machine having supporting means and a plurality of spaced slicing blades mounted to travel longitudinally thereon, a guide unit comprising a removable bar pivotally mountable upon the supporting means and vertically adjustable thereon, a plurality of fingers united to said bar interposed between the successive blades to space and guide the cutting portions thereof during the slicing operation, the pivoted mounting of said bar adapting it to be swung clear of the blades so as to permit convenient removal either of said guide bar or of said blades, and means to rigidly secure the bar with the fingers in a given angular position.

5. In a bread slicing machine having supporting means and a plurality of spaced slicing blades mounted to travel longitudinally thereon, an adjustable guide member comprising a shaft having one end removably united to the supporting means, a crossbar with brackets at each end thereof slidingly mounted upon the shaft and carrying a plurality of pointed fingers adapted to extend between the slicing blades when in operable position, bores formed in the brackets respectively, corresponding bores formed in the shaft and threaded, bolts seated in the bores of the brackets and threaded into the bores in the shaft adapted to adjust the relative spacing of the crossbar and the shaft.

6. In a bread slicing machine, the combination with supporting and driving means, of a plurality of band-blades mounted to travel longitudinally thereon, a spaced adjustable guide assembly comprising a shaft having one end removably united to the supporting means and its other end free, a crossbar slidingly mounted upon the shaft carrying a plurality of fingers to space, twist and guide the blades in their cutting courses when in operable position, and means threaded in the crossbar and coacting with the shaft to adjustably secure the crossbar upon the shaft in a plurality of adjustable positions of rotation thereon.

HARRY J. CRINER.